United States Patent [19]

Hinsberg et al.

[11] Patent Number: 4,626,036

[45] Date of Patent: Dec. 2, 1986

[54] SPOKE WHEEL

[75] Inventors: René Hinsberg, Munich; Markus Poschner, Schweitenkirchen, both of Fed. Rep. of Germany

[73] Assignee: Bayerische Motoren Werke AG, Munich, Fed. Rep. of Germany

[21] Appl. No.: 674,142

[22] Filed: Nov. 23, 1984

[30] Foreign Application Priority Data

Nov. 25, 1983 [DE] Fed. Rep. of Germany ....... 3342608

[51] Int. Cl.⁴ .............................................. B60B 1/04
[52] U.S. Cl. ......................................... 301/58; 301/59
[58] Field of Search ........................ 301/55, 58, 59, 61,
301/67, 68, 69, 70

[56] References Cited

U.S. PATENT DOCUMENTS 741,877 10/1903 Best .................................. 301/61 X
1,954,445 4/1934 Farr ......................................... 301/58

FOREIGN PATENT DOCUMENTS 3028827 2/1982 Fed. Rep. of Germany .
1150994 1/1958 France .................................. 301/59

Primary Examiner—David A. Scherbel
Attorney, Agent, or Firm—Barnes & Thornburg

[57] ABSTRACT

A spoke wheel consisting of a wheel hub and of a rim which are connected with each other by a number of spokes. The rim thereby carries a tire. In order that the tire can be of tubeless construction, the relatively wide rim flanges are provided with mounting bores through which extend the spokes.

12 Claims, 2 Drawing Figures

SPOKE WHEEL

The present invention relates to a spoke wheel consisting of a wheel hub and of a rim which are connected with each other by a number of spokes, as disclosed in DE-OS No. 30 28 827.

In the prior art spoke wheel, the rim consists of two rim parts axially slipped one within the other within the area of the rim well and connected with each other, whereby a radial intermediate space is formed at the rim well. Owing to the intermediate space the spoke heads can be inserted into the inner rim part without the use of sealing means. The two-partite construction of the rim, however, is very costly from a work point of view and is therefore very expensive to manufacture. Furthermore, the weight of the spoke wheel and therewith also the weight of the unsprung mass is increased thereby.

It is the object of the present invention to so construct a spoke wheel of the aforementioned type that it can be manufactured with low manufacturing costs and can be used especially for a tubeless tire, while dispensing with additional elements increasing its weight.

The underlying problems are solved according to the present invention in that the mounting bores for the spoke heads or spoke nipples are arranged in the rim flanges.

In addition to avoiding the disadvantages of the state of the art, a considerable advantage of the present invention resides in the fact that the rim can be constructed very simply and therewith very inexpensively for use with a tubeless tire; for compared to the prior art rim carrying a tubeless tire, only the rim flanges of the rim of the spoke wheel according to the present invention have to be slightly widened whereby mounting bores, which are arranged according to the present invention in the rim flanges, also have to be drilled in the prior art rims within the area of the rim well.

The through-bores on the side of the hub can be drilled in an uncomplicated manner through a fastening ring provided at the hub, which extends circumferentially or sectionwise.

These and further objects, features and advantages of the present invention will become more apparent from the following description when taken in connection with the accompanying drawing which shows for purposes of illustration only, one embodiment in accordance with the present invention, and wherein.

Figure 1:
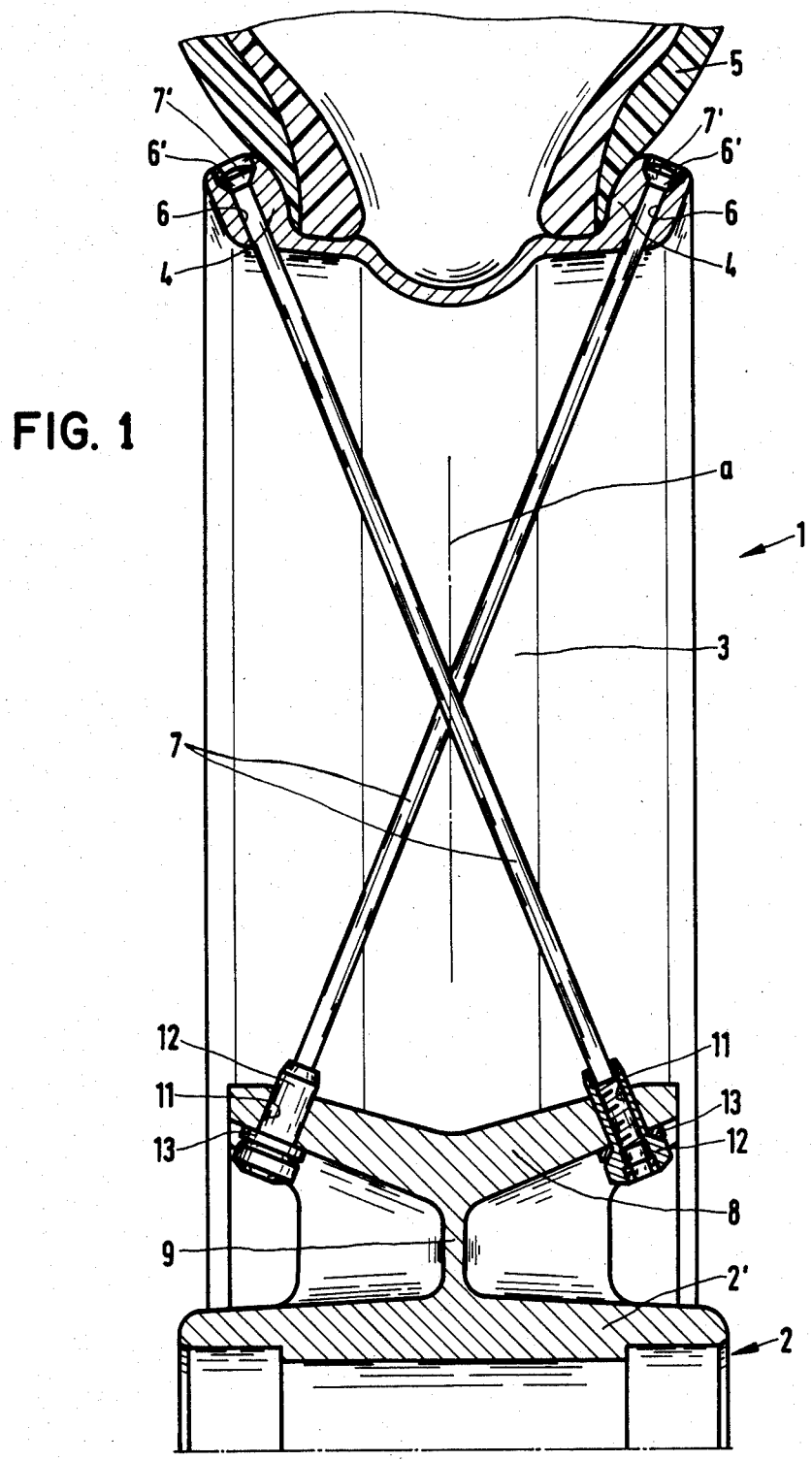
FIG. 1 shows a partial cross-sectional view through a spoke wheel in accordance with the present invention, whereby the spokes are shown in the cross-sectional plane for the sake of more easy understanding.

The spoke wheel generally designated by reference numeral 1, essentially consists of a hub generally designated by reference numeral 2 and of a rim 3 which carries a tubeless tire 5 between its two rim flanges 4. A number of mounting bores 6 arranged at equal or unequal angular distances extend through the two relatively wide rim flanges 4; one spoke 7 each is arranged in a respective mounting bore 6. The mounting bores 6 thereby extend obliquely to the rim center plane a in such a manner that the spokes 7 cross one another within the area thereof. Furthermore, the spokes 7 each include a head 7' which are each located in a corresponding countersunk hole 6' of the mounting bores 6.

Figure 2:
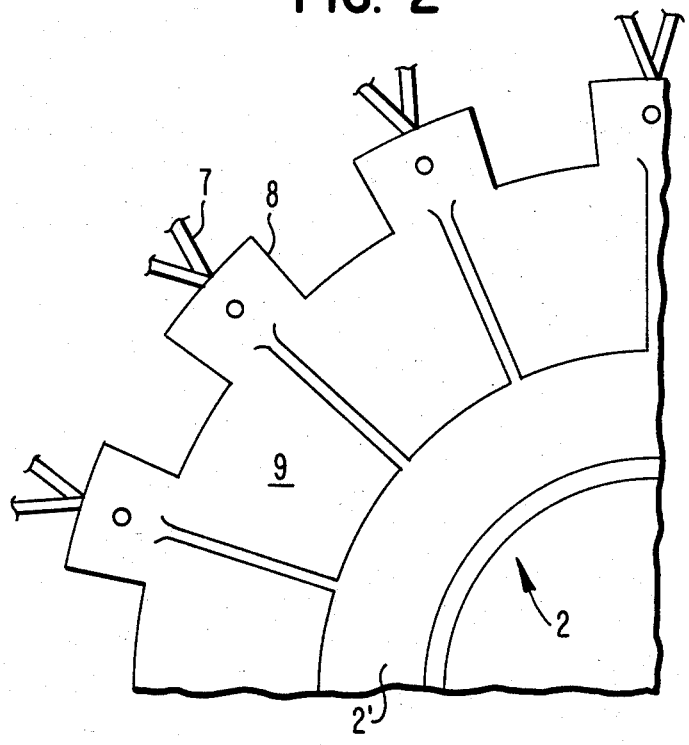
FIG. 2 is a schematic showing of a partial side view of a modification of the hub of FIG. 1, wherein a segmentation of the fastening ring is schematically illustrated.

The wheel hub 2 includes a fastening ring 8 having a ridge-shaped cross-sectional profile which surrounds concentrically and with a radial spacing the outer circumference of its hub body 2'; the ridge area of the fastening ring 8 facing the hub body 2' is connected with the latter by a circumferential connecting rib 9. The connecting rib 9 as also the ridge area of the fastening ring 8 are disposed within the area of the rim center plane a. The fastening ring 8 may be constructed as a continuous ring (FIG. 1) or as a plurality of ring segments (FIG. 2) whereby one ring section each serves for the mounting of two spoke pairs. Through-bores 11 are provided at the two outwardly disposed edges of the fastening ring 8 which extend obliquely to the rim center plane a; one spoke nipple 12 each provided with a hexagonal configuration is inserted into the through-bores 11, whereby the spoke nipples 12 are screwed over the threaded section provided at the free end portion of the spokes 7 under interposition of a washer disc 13—with the spokes 7 extending each obliquely to the oppositely disposed rim flange 4. Thus, the wheel hub 2 is connected concentrically with the rim 3 by way of spokes 7 crossing each other pairwise. The rim 3 is able to carry a tubeless tire 5 owing to the mounting bores 6 for the spokes 7 which are provided in the rim flanges 4 thereof.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A spoke wheel for a tubeless tire comprising a wheel hub and a rim means comprising radially extending rim flanges on opposite sides of a rim base for securing a tire to the rim means, through-bore mounting means in the rim flanges and in the wheel hub with through bores in the rim flange being axially aligned with through bores in the hub, the wheel hub and rim means being connected with each other by a number of spokes having spoke heads and spoke nipples, at least one of the spoke heads and spoke nipples being inserted into the respective axially aligned mounting bore means provided in the hub and in the rim flanges of the rim means.

2. A spoke wheel according to claim 1, wherein the wheel hub includes a fastening ring means for the spokes which concentrically surrounds the outer circumference of its hub body and is connected with the latter at a radial distance by way of a connecting rib, said fastening ring means having an approximately ridge-shaped cross-sectional profile whose ridge area facing the hub body passes over into the connecting rib.

3. A spoke wheel according to claim 2, wherein the fastening ring means is constructed as a continuous circumferential ring.

4. A spoke wheel according to claim 2, wherein the fastening ring means is constructed as a plurality of ring segments.

5. A spoke wheel according to claim 2, wherein the spoke nipples are inserted into through-bores of the fastening ring means.

6. A spoke wheel according to claim 5, wherein the spokes cross one another within the area of the rim center plane.

7. A spoke wheel according to claim 6, wherein the fastening ring means is constructed as a continuous circumferential ring.

8. A spoke wheel according to claim 6, wherein the fastening ring means is constructed as a plurality of ring segments.

9. A spoke wheel according to claim 2, wherein the rim flanges have enlarged areas extending laterally away from the rim base and wherein the through-bores for the rim flanges are located in these enlarged areas.

10. A spoke wheel according to claim 1, wherein the spokes cross one another within the area of the rim center plane.

11. A spoke wheel according to claim 1, wherein the spoke nipples are inserted into through-bores of the fastening ring means.

12. A spoke wheel according to claim 1, wherein the rim flanges have enlarged areas extending laterally away from the rim base and wherein the through-bores for the rim flanges are located in these enlarged areas.

* * * * *